(12) United States Patent
Okada (10) Patent No.: US 8,341,979 B2
(45) Date of Patent: Jan. 1, 2013

(54) METHOD OF HEAT TREATING A POROUS OPTICAL FIBER PREFORM

(75) Inventor: Kenji Okada, Sakura (JP)

(73) Assignee: Fujikura Ltd., Tokyo (JP)

( * ) Notice: Subject to any disclaimer, the term of this patent is extended or adjusted under 35 U.S.C. 154(b) by 225 days.

(21) Appl. No.: 12/474,689

(22) Filed: May 29, 2009

(65) Prior Publication Data
US 2010/0029458 A1 Feb. 4, 2010

(30) Foreign Application Priority Data

Aug. 4, 2008 (JP) ................................. 2008-201299

(51) Int. Cl.
*C03B 37/023* (2006.01)

(52) U.S. Cl. ............................................ 65/384; 65/427

(58) Field of Classification Search .................... 65/384, 65/427
See application file for complete search history.

(56) References Cited

U.S. PATENT DOCUMENTS

| | | | | |
|---|---|---|---|---|
| 4,304,583 A * | 12/1981 | Aronson et al. | ................ | 65/426 |
| 4,610,709 A * | 9/1986 | Kawauchi et al. | ............... | 65/397 |
| 4,620,861 A * | 11/1986 | Berkey | .............................. | 65/399 |
| 4,950,319 A * | 8/1990 | Lane et al. | ........................ | 65/508 |
| 4,978,378 A * | 12/1990 | Ito et al. | ............................ | 65/424 |
| 5,067,975 A * | 11/1991 | Backer et al. | .................... | 65/413 |
| 5,356,449 A * | 10/1994 | Kuwahara et al. | ............... | 65/421 |
| 5,423,898 A * | 6/1995 | Terashima et al. | ............... | 65/381 |
| 5,656,057 A * | 8/1997 | Brown et al. | ..................... | 65/421 |
| 5,713,979 A * | 2/1998 | Nicholson et al. | ............... | 65/424 |
| 5,755,849 A * | 5/1998 | Hoshino et al. | .................. | 65/381 |
| 5,837,024 A * | 11/1998 | Fabian | ............................ | 65/17.4 |
| 6,047,564 A * | 4/2000 | Schaper et al. | .................. | 65/17.4 |
| 6,542,680 B2 * | 4/2003 | Koumura et al. | .............. | 385/123 |
| 2003/0000255 A1 | 1/2003 | Kohmura et al. | | |
| 2003/0215204 A1 * | 11/2003 | Schroeder et al. | ............. | 385/132 |

FOREIGN PATENT DOCUMENTS

| | | |
|---|---|---|
| JP | 2000128563 A | 5/2000 |
| JP | 2002-047013 A | 2/2002 |
| JP | 2003-081657 A | 3/2003 |
| JP | 2005-263557 A | 9/2005 |
| RU | 2086513 C1 | 8/1997 |
| RU | 2236386 C2 | 9/2004 |
| RU | 2281260 C1 | 8/2006 |
| SU | 1776646 A1 | 5/1990 |

OTHER PUBLICATIONS

Notice of Reasons for Rejection, mailed Sep. 11, 2012, issued in Japanese Patent Application No. 2008-201299.

* cited by examiner

*Primary Examiner* — John Hoffmann
(74) *Attorney, Agent, or Firm* — Sughrue Mion, PLLC (57) ABSTRACT

A method of producing an optical fiber preform by heating a glass preform that has a glass rod and a silica glass porous body and includes a valid portion and invalid portions, comprising: heating the glass preform while moving the glass preform along its axial direction relative to a heater; stopping the relative movement or decreasing a speed of the relative movement when an invalid portion positioned at a tail end reaches a vicinity of the heater; heating the invalid portion for a predetermined time while maintaining a temperature at which the silica glass porous body can be vitrified; decreasing the heating temperature to a temperature determined by adding 200° C. to an annealing point of a silica glass; and removing the glass preform to the outside of the heating furnace without increasing the heating temperature to the temperature at which the silica glass porous body is vitrified.

9 Claims, 7 Drawing Sheets

METHOD OF HEAT TREATING A POROUS OPTICAL FIBER PREFORM

BACKGROUND OF THE INVENTION

1. Field of the Invention

The present invention relates to a method of producing an optical fiber preform capable of improving impact-resistance and heat-shock resistance. The present invention also relates to an optical fiber preform produced by the same method. The present invention further relates to a glass rod for producing an optical fiber, which is appropriately used in the same method.

Priority is claimed on Japanese Patent Application No. 2008-201299, filed Aug. 4, 2008, the content of which is incorporated herein by reference.

2. Description of Related Art

In the production of an optical fiber preform, a glass rod is generally prepared to have a structure corresponding to a core of an optical fiber or a core and a clad deposited on the core of an optical fiber (such a glass rod is hereinafter, referred to as a glass rod). Next, a porous glass preform is obtained by growing and depositing porous silica glass particles (soot) on the periphery of the glass rod, where the porous silica glass particles are formed by flame hydrolysis, thermolysis or the like. Next, the porous glass preform is heat treated in a heating furnace to perform sintering, and where necessary, dehydration, thereby vitrifying the silica glass porous body to a transparent glass and obtaining an optical fiber preform.

For example, VAD (Vapor Axial Deposition) Method, OVD (Outside Vapor Deposition) Method or the like may be used as a method of producing a silica glass porous body. In the VAD method, a porous glass preform is obtained by depositing soot on a tip of a seed rod, and growing the soot deposit in the vertical direction. In the OVD method, a porous body is obtained by depositing a soot on a periphery of a glass core. The glass core used in the OVD method may be a glass rod formed by vitrifying a silica glass porous body formed by the VAD method or the like, or a glass rod formed by drawing the vitrified silica glass porous body.

For example, the silica glass porous body may be vitrified by suspending the porous glass preform along the vertical direction, and moving the porous silica glass preform relative to the heater in the heating furnace or moving the heater relative to the porous silica glass preform in the heating furnace, thereby vitrifying the silica glass porous body from one end to the other end.

In the above-described vitrification method, temperature in the heating furnace is controlled by controlling an input power of the heater based on a surface temperature of the heater measured by a radiation thermometer of the like, and on a preliminary identified relationship between the input power and the heating temperature, or other properties.

As explained above, in the vitrification method, the temperature of vitrifying the porous glass to a transparent glass is controlled to be in an appropriate range by controlling a temperature of the heating furnace. In general, before vitrifying the porous glass by sintering, dehydration process is performed so as to remove moisture included in the soot. A temperature used in the dehydration process is about 1000° C. On the other hand, vitrification by sintering is performed at relatively higher temperature of about 1500° C.

In the production of an optical fiber preform, a preform is produced to have a valid portion and invalid portions positioned on both ends of the valid portion. The valid portion denotes a portion usually worked to an optical fiber. In a porous glass preform, two end portions constitute the invalid portions, and a main portion lying between the two end portions constitutes the valid portion.

In the above-described production of an optical fiber preform, there is a case where the glass rod is constituted to have a first rod and dummy rods fusion-bonded to both ends of the first rod, and the silica glass porous body is deposited on a periphery of the glass rod. In this case, along an axial direction (direction of the center axis), a portion of the dummy rod, that is, a portion from the fusion-bonded boundary to a tip end, constitutes an invalid portion, and a portion of the first glass rod constitutes the valid portion. In this case, after the production of the optical fiber preform, a dummy rod may be removed from a partial portion of the invalid portion, and reused in a production of an optical fiber preform.

Mass production of optical fiber preforms and optical fibers are proceeding in accordance with recently increasing demand. Therefore, there are requirements for increasing the size of a preform, shortening of a time of the production of the preform, and enhancement of drawing speed, or the like. In particular, it is effective to increase the size of the preform to decrease a production cost of an optical fiber per unit length. Therefore, various researches have been carried out in order to enlarge the sizes of optical fiber preforms.

For example, Patent Reference 1 (Japanese Unexamined Patent Application, First Publication No. 2003-81657) discloses a method of optimizing a vitrification process in relation with a method of vitrifying a large sized porous glass preform. Patent Reference 1 proposes a method of optimizing a vitrification temperature, moving speed of the preform, and gas supply conditions with the intention of suppressing the occurrence of a non-vitrified unsintered portion, and elongation of the preform caused by an excessive vitrifying temperature.

In the method described in Patent Reference 1, while moving the porous glass preform in a heating region, the heating temperature of the porous glass preform and the moving speed of the preform in a heating region are decreased in a tail end of the preform compared with a top end of the preform heading to its moving direction. In this case, in the tail end opposite to the top end, radial thermal distribution is generated in a dummy rod (glass rod in an invalid portion) supporting the silica glass porous body such that the temperature of the circumferential portion is higher than the temperature of the central portion. In a production of a large-sized porous glass preform, temperature difference along the radial direction is further expanded since the dummy rod is required to have a large diameter so as to support a silica glass porous body of large mass. Where a large temperature difference along a radial direction is generated in the dummy rod, viscosity difference is generated depending on the temperature difference, thereby generating large difference of the residual strain in the glass along the radial direction. As a result, shock resistance of the dummy rod is deteriorated. Therefore, there was a problem that the dummy rod tended to deform by cracking, failing (breaking), or the like by the application of vibration or impact during removing the produced optical fiber preform from the production apparatus and carrying the optical fiber preform. In addition, in the case of reusing such a dummy rod in production of an optical fiber preform, because of the low shock resistance of the dummy rod, there was a problem that a rapid heating of the dummy rod tended to occur deformation such as cracking or breaking. Such a problem is prominent when a large tensile stress remains on the periphery of the dummy rod depending on the radial thermal distribution of the dummy rod. Reprocessing of the dummy rod, for example by annealing, to release the residual strain before reusing the dummy rod may be taken into consideration as a method for inhibiting the deformation of the dummy rod at the time of reusing the dummy rod However, in such a case, there is a possibility of deforming the dummy rod during the reprocessing, and an additional process increases the production cost. In addition, there was a problem that the deformation of the dummy rod was further magnified by the influence of increased mass of the silica glass porous body.

Based on the above-described circumstance, an object of he present invention is to provide a method of producing an optical fiber preform that includes vitrifying a silica glass porous body and enhances shock resistance and heat-shock resistance of the glass rod in the invalid portion, and can be applied to a large sized optical fiber preform. Another object of the present invention is to provide an optical fiber preform produced by the same method, and a glass rod which is appropriately used in the production of the optical fiber preform.

SUMMARY OF THE INVENTION

A method of producing an optical fiber preform according to the present invention by subjecting a glass preform (porous glass preform) that has a glass rod and silica glass porous body deposited on a periphery of the glass rod and includes a valid portion used in a production of an optical fiber, and invalid portions (support portions) adjacent to the valid portion to heat treatment using a heater in a heating furnace to vitrify the silica glass porous body comprises:

performing a first step of heating the glass preform to heat the glass preform while moving the glass preform along its axial direction relative to the heater;

subsequent to the first step, performing a second step of stopping the relative movement or decreasing a speed of the relative movement when an invalid portion positioned at a tail end opposite to the moving direction of the glass preform reaches a vicinity of the heater;

subsequent to the second step, performing a third step of heating the invalid portion for a predetermined time while maintaining a heating temperature at which the silica glass porous body can be vitrified;

subsequent to the third step, performing a fourth step of decreasing the heating temperature in the heating furnace to a temperature determined by adding 200° C. to an annealing point of a silica glass; and performing a fifth step of removing the glass preform (vitrified glass preform) to the outside of the heating furnace without increasing the heating temperature to the temperature at which the silica glass porous body is vitrified.

In the above-described method of producing an optical fiber preform, a diameter X (mm) of the glass rod in the invalid portion and the duration Y(minute) of maintaining the heating temperature in the third step preferably satisfy a relation expressed by the following formula, $$0.020X^2 - 0.597X + 3.588 \leq Y \leq 0.022X^2 + 0.280X - 13.104 \quad (1)$$

where Y is controlled to be 0 minutes when the formula (1) provides a value of Y smaller than 0.

In the method of producing an optical fiber preform according to the present invention, it is preferable that the mass of the glass preform is not smaller than 20 kg.

In the method of producing an optical fiber preform, it is preferable to stop the relative movement or decrease the speed of the relative movement of the glass preform in the second step in a state at which a position of the heater along the axial direction of the glass preform overlaps the position of the invalid portion at the tail end.

In the above-described method of producing an optical fiber preform, it is preferable to control a temperature difference in the invalid portion along the radial direction of the glass rod to be no lower than 100° C. and no higher than 250° C. from the end of the third step to the beginning of the fourth step.

In the above-described method of producing an optical fiber preform, the heating temperature in the first step is preferably not lower than 1400° C. and not higher than 1600° C.

In the above-described method of producing an optical fiber preform, it is preferable to decrease the heating temperature in the heating furnace to be within a range of 1000° C. to 1350° C.

An optical fiber preform according to the present invention is an optical fiber preform produced by the above-described method of the present invention.

A glass rod for producing an optical fiber preform ( a glass rod for supporting an optical fiber preform ) according to the present invention may be a glass rod removed from the invalid portion which has been subjected to the heating for the predetermined duration in the above-described third step.

According to the present invention, it is possible to obtain an optical fiber preform including a glass rod having improved shock resistance and heat-shock resistance. The method of the present invention exerts remarkable effect especially in the production of a large sized optical fiber preform. As a result, it is easy to treat the optical fiber preform. In addition, a glass rod removed from the invalid portion may be reused in the production of an optical fiber preform without reprocessing. Therefore, it is possible to produce an optical fiber preform of high quality at low cost.

BRIEF EXPLANATION OF DRAWINGS

FIGS. 4A and 4B are graphs showing a relationship between the temperature in the glass rod and a retention time where the diameter of the glass rod in the invalid portion is assumed to be 20 mm.

FIGS. 5A and 5B are graphs showing a relationship between the temperature in the glass rod and a retention time where the diameter of the glass rod in the invalid portion is assumed to be 30 mm.

FIGS. 6A and 6B are graphs showing a relationship between the temperature in the glass rod and a retention time where the diameter of the glass rod in the invalid portion is assumed to be 40 mm.

PREFERRED EMBODIMENTS

In the following, the present invention is explained in detail with reference to the drawings.

Method of Producing an Optical Fiber Preform

A method of producing an optical fiber preform according to the present invention comprises: heat treating a glass preform (porous glass preform) that has a glass rod and a silica glass porous body deposited on a periphery of the glass rod by a heater in a heating furnace, wherein the glass preform includes a valid portion used in a production of an optical fiber, and invalid portions (support portions) adjacent to the valid portion. The method comprises the following steps.

In the first step (first heat treatment step), heat treatment of the glass preform is performed while moving the glass preform relative to the heater along the axial direction of the glass preform. In the above-described relative movement, a portion of the silica glass porous body is heated by a heater when the glass rod passes through a heating region in the heating furnace. The relative movement of the glass preform and the heater is performed such that a position of the portion of the silica glass porous body heated by the heater moves from one end to another end of the silica glass porous body. The glass preform has two ends in its lengthwise direction. Where one end heading to the moving direction is denoted as a top end, and the other end opposite to the top end is denoted as a tail end, the movement of the glass preform relative to the heater is performed such that a position of a heated portion moves from the top end to the tail end.

The second step (deceleration step) is performed after the first step. In the second step, the relative movement is stopped or a speed of the relative movement is decreased when the invalid potion positioned at the tail end opposite to the top end heading to the moving direction reaches the vicinity of the heater.

The third step (second heat treatment step) is performed after the second step. In the third step, heat treatment of the invalid potion (invalid portion at the tail end) is continued for a predetermined retention time while retaining the heating temperature to be a temperature at which the silica glass porous body can be vitrified to a transparent glass.

The fourth step (cooling step) is performed after the third step. In the fourth step, heating temperature in the heating furnace is decreased to be not higher than a temperature obtained by adding 200° C. to an annealing point of a silica glass. In other words, where Ta (° C.) denotes the annealing point of the silica glass, the heating temperature is decreased to be no higher than Ta+200(° C.).

The fifth step (removal step) is performed after the fourth step. In the fifth step, the glass preform (vitrified glass preform) is removed from the heating furnace to the outside without increasing the heating temperature to the temperature at which the silica glass porous body can be vitrified.

In the above-described optical fiber preform, at least one end of the glass rod may have a portion of predetermined length not deposited with the silica glass porous body. That is, an exposed glass rod of a predetermined length may be projected from the invalid portion.

Preferably, in the above-described method of producing an optical fiber preform, the silica glass preform is arranged along a vertical direction and the glass preform and the heater is relatively moved along the vertical direction. At that time, in the second step, it is preferable to lower the glass preform relative to the heater such that the position of the heated portion of the silica glass porous body moves from lower portion to upper portion of the silica glass porous body. That is, in the third step, it is preferable to subject the upper invalid portion of the glass rod to the heat treatment.

The valid portion of the glass preform may have a cylindrical (columnar) shape. At least a partial portion of each of the invalid portion of the glass rod may have a tapered shape such that the outer diameter decreases towards its end.

In the present invention, the valid portion denotes a portion which can be worked to an optical fiber. The invalid portion is not worked to an optical fiber. However, the invalid portion can be used as a portion for supporting the valid portion during the production process of an optical fiber preform and the production process of an optical fiber.

In the description of the present invention, the definition of the term "silica glass porous body" includes a body on the way of converting to a transparent glass during the vitirification process by heat treatment.

The glass rod on the way of integration with the surrounding silica glass during the vitrification process of the porous silica body is also called a glass rod.

The porous glass preform having the silica glass porous body and the glass preform in which the silica glass porous body is imperfectly vitrified are called a glass preform.

In the present invention, the glass rod is used as a core member to be deposited with a silica glass porous body on its periphery.

Deposition of the silica glass porous body may be performed by a general method such as an OVD method. In the production of an optical fiber preform, a main portion of the glass preform is constituted of a glass rod having a structure corresponding to a core or a core and a clad deposited on the core of the optical fiber. The glass rod may have a well known structure. For example, it is possible to use a glass rod produced by a generally known method such as a VAD method, a CVD method, and an OVD method.

The glass rod may be constituted only of a glass rod which can be worked to a constituent of an optical fiber. Preferably, the glass rod may be constituted of a first glass rod (glass rod main body) which can be worked to a constituent of an optical fiber, and second and a third glass rods fusion-bonded as dummy rods to both ends of the first glass rod. The second and the third glass rods used as the dummy rods may be selected from glass rods used as dummy rods in the general production method of an optical fiber. A diameter of the dummy rod is controlled in accordance with the desired side of an optical fiber preform so as to have a sufficient strength. By such constitution of the glass rod, it is possible to make a large fraction of the first glass rod fusion-bonded with the dummy rods to a constituent of a valid portion. In the present invention, the term glass rod may include the above-described glass rod having the fusion-bonded dummy rods.

Glass Preform

The glass preform may be produced by a generally known method. For example, the glass preform may be prepared by setting a glass rod in an apparatus for depositing a silica glass porous body, synthesizing fine glass particles from a raw material gas using a burner, and depositing the fine glass particles on the periphery of the glass rod. As a method of depositing the silica glass porous body, it is possible to use a soot deposition method such as VAD method and OVD method. A schematic cross sectional drawing of the thus produced porous glass preform is shown in FIG. 1.

Figure 1:
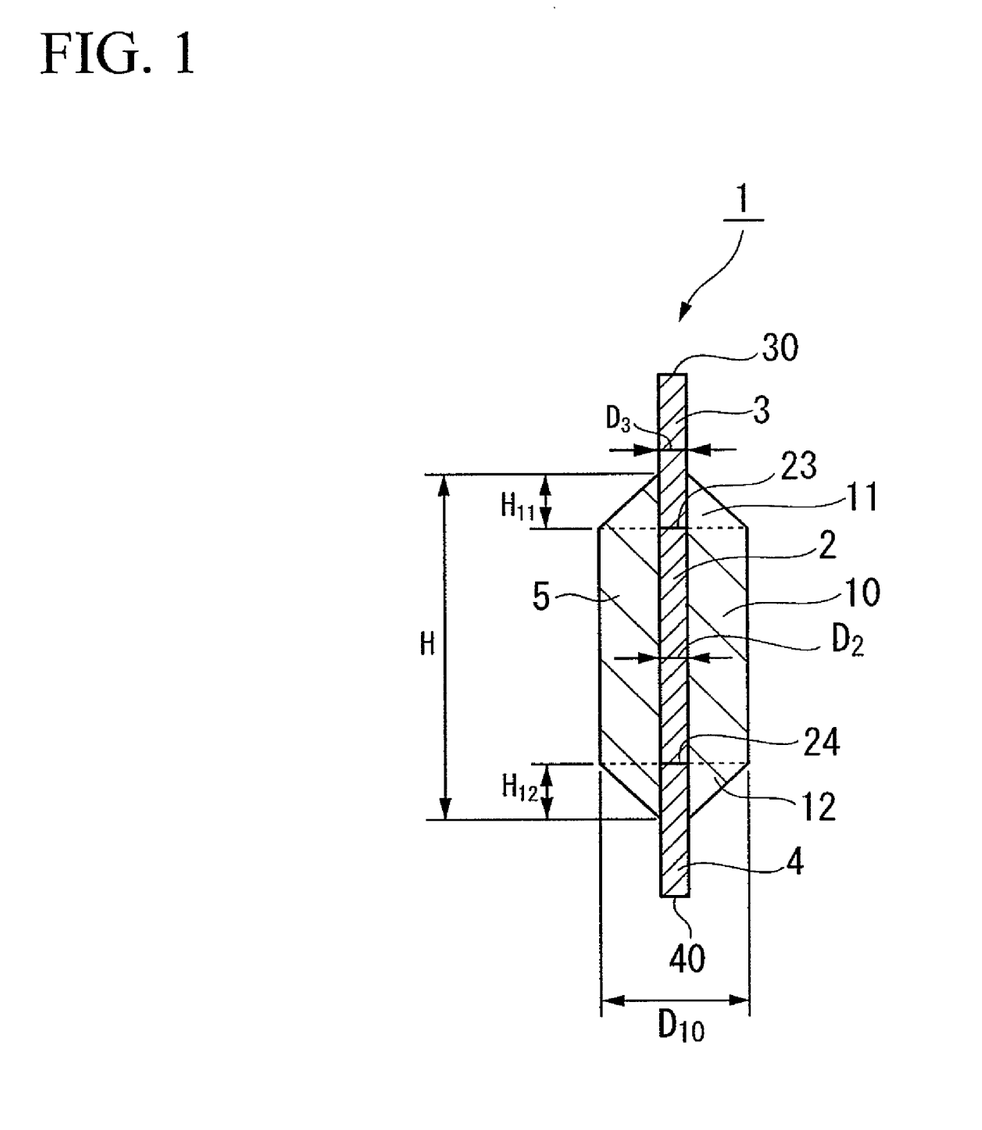
FIG. 1 is a schematic vertical cross section for exemplifying a glass preform.

In the glass preform 1 shown in FIG. 1, a first dummy rod 3 (second glass rod) having a diameter $D_3$ is fusion-bonded to one end of a glass rod 2 (a first glass rod: glass rod main body) having a diameter $D_2$, and a second dummy rod 4 (a third glass rod) is fusion-bonded to another end of the glass rod 2. A silica glass porous body 5 is continuously deposited on the whole area of the periphery of the glass rod, and on the peripheries of the portions of the first dummy rod 3 and the second dummy rod 4 on the side of the glass rod 2. An end portion of the silica glass porous body 5 is made to have a tapered shape such that a diameter thereof gradually decreases along the axial direction of the glass rod 2 from the portion corresponding to the fusion-bonded boundary 23 (hereafter referred to as fused portion) of the glass rod 2 and the first dummy rod 3 towards the end portion 30 of the first dummy rod 3. Another end portion of the silica glass porous body 5 is also made to have a tapered shape such that a diameter thereof gradually decreases along the axial direction of the glass rod 2 from the portion corresponding to the fusion-bonded boundary 24 (hereafter referred to as a second fused portion) of the glass rod 2 and the second dummy rod 4 towards the end portion 40 of the second dummy rod 4. A method for shaping the silica glass porous body to a tapered shape is not limited, and it is possible to apply a generally known method. The above-described two tapered portions preferably have an equivalent shape. On the periphery of the glass rod 2, the silica glass porous body 5 has a substantially constant diameter at any position along an axial direction of the glass rod 2. The silica glass porous body has a length H along the axial direction. The glass rod 2, the first dummy rod 3, the second dummy rod 4, and the silica glass porous body 5 are preferably arranged concentrically. A portion of the glass preform 1 having a silica glass porous body 5 of tapered shape on the periphery of the first dummy rod 3 along the axial direction of the glass rod 2 constitutes a first invalid portion 11. A portion of the glass preform 1 having a silica glass porous body of tapered shape on the periphery of the second dummy rod 4 along the axial direction of the glass rod 2 constitutes a second invalid portion 12. In FIG. 1, H denotes a predetermined length of the silica glass porous body 5 along the axial direction, $H_{11}$ denotes a predetermined length of the first invalid portion 11 along the axial direction, and $H_{12}$ denotes a predetermined length of the second invalid portion 12 along the axial direction. In the glass preform 1, the portion interposed between the first invalid portion 11 and the second invalid portion constitutes a valid portion 10 having a diameter D10. The valid portion 10 corresponds to a portion of the optical fiber preform 1 which can be worked to an optical fiber in a production process of an optical fiber.

As described above, the portions of the glass preform 1 corresponding to the two end portions of the silica glass porous body 5 constitute the first invalid portion 11 and the second invalid portion 12. In each of these invalid portions, the silica glass porous body 5 has a tapered shape. Although it is not necessary to form the outer shapes of the invalid portions to be the tapered shapes, it is preferable to form the outer shapes of the invalid portions to be tapered shapes. Where the invalid portion has a tapered outer shape, it is possible to achieve an excellent effect for preventing cracking of the glass preform 1 starting from the invalid portion. The silica glass porous body 5 may have a tapered shape in a partial portion of the invalid portion. The silica glass porous body 5 preferably has a tapered shape throughput the whole length of the invalid portion. It is acceptable if only one invalid portion (the first invalid portion 11 or the second invalid portion 12) has a tapered shape. Preferably, both of the invalid portions (the first invalid portion 11 and the second invalid portion 12) have tapered shapes.

The dimension of the glass preform is not limited. Where the glass preform has a large mass, the present invention exhibits further excellent effects. It is effective to use a glass rod of a large diameter for forming a glass preform of a large mass. The glass rod of a large diameter has a peripheral surface of a large area. In this case, a large force is applied on the glass rod of the invalid portion during the below-described vitrification process. However, since the glass preform has a large area, it is possible to further reduce the difference in residual stress along the radial direction of the glass rod by reducing the temperature difference along the same direction. Therefore, since the present invention enables reduction of the temperature difference along the radial direction to a level smaller than that of the conventional case, it can be appropriately applied for the production of a glass preform having a large mass.

Preferably, the glass preform has a mass of 15 kg or more, and more preferably 20 kg or more. In this case, the effect of the present invention is further prominent.

The glass preform is subjected to a heat treatment by a heater in the heating furnace so as to vitrify the deposited silica glass porous body to a transparent glass. As the vitrification process and the subsequent process, the present invention has the first to fifth steps. Each of the steps are explained in detail below.

A First Step

In the first step, the glass preform is moved relative to the heater along the direction in parallel with the center axis of the glass preform to perform heat treatment of the glass preform. Here, the movement of glass preform relative to the heater denotes a change of relative position of the glass preform and the heater. Specifically, the relative movement of the glass preform and the heater include (A) fixing the heater and moving the glass preform, (B) fixing the glass preform and moving the heater, and (C) moving the heater and the glass preform so as to change their relative position. Among the above-described relative movements, (A) fixing the heater and moving the glass preform is preferred in a view point of a simple operation.

Figure 2:
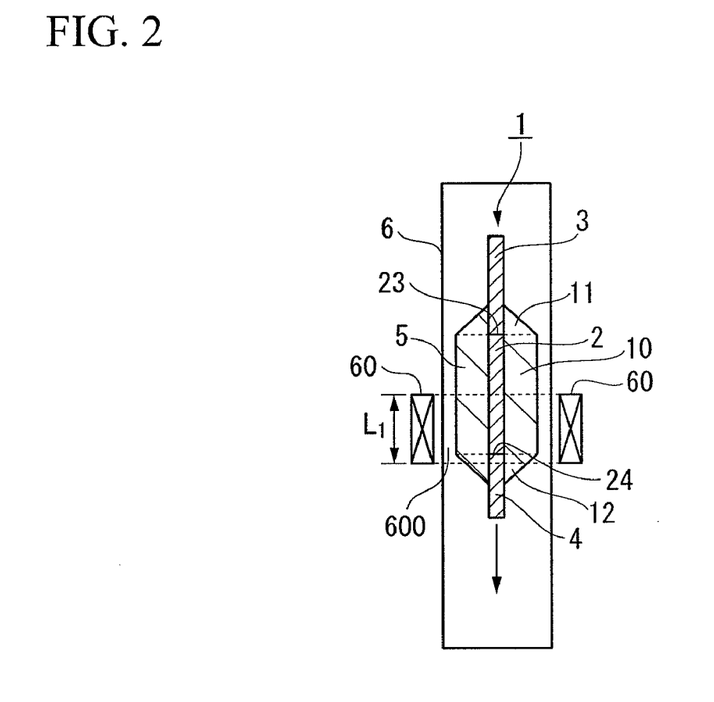
FIG. 2 is a vertical cross section schematically exemplifying a glass preform in the zone heating furnace.

By performing the above-described relative movement, the silica glass porous body is made to pass through the heating region (hot region) heated by the heater such that the position of a heated portion of the silica glass porous body heated in the heating region moves from one end of the silica glass porous body to the other end of the silica glass porous body to vitrify the silica glass porous body to a transparent glass. FIG. 2 is a schematic cross section exemplifying a state of a glass preform in a zone heating furnace for explaining an embodiment in the case of (A) fixing the heater and moving the glass preform. The "zone heating furnace" denotes a heating furnace for performing a heat treatment by passing the subject of heating through the heating region arranged in a region in the heating furnace.

As shown in FIG. 2, a heater 60 is disposed in the zone heating furnace 6 so as to surround a predetermined space. The glass preform 1 is set to be movable in the direction shown by the arrow from the upper side to the lower side of the heater along the axial direction of the glass rod 2 in the region 600 (hereafter referred to as a main heating region) surrounded by the heater 60. Where the heater 60 has a predetermined length $L_1$ along the moving direction of the glass preform 1, it is preferable that the heater satisfies $H > L_1$.

In the first step, the glass preform 1 is lowered such that the second invalid portion 12, the valid portion 10, and the first invalid portion 11 are heated in this order. In the above-described heat treatment, it is possible to apply a generally known heat treatment method.

A moving velocity of the glass preform 1 in the first step is not limited provided that the silica glass porous body 5 can be vitrified sufficiently. Preferably, the moving velocity of the glass preform 1 in the first step is 70 to 200 mm/hour, more preferably 100 to 150 mm/hour.

A heating temperature in the first step is preferably 1400 to 1600° C., more preferably 1400 to 1550° C.

A Second Step

In the second step, the relative movement of the glass preform 1 is stopped or its moving velocity is decreased at the time when the invalid portion on the side opposite to the top end in the moving direction reaches the vicinity of the heater. Here, the vicinity of the heater denotes a region where the glass preform is heated sufficiently.

Preferably, in the second step, the relative movement is stopped or the moving velocity is decreased when the invalid portion reaches a region of 1400 to 1600° C., more preferably 1400 to 1550° C. in heating temperature.

Figure 3:
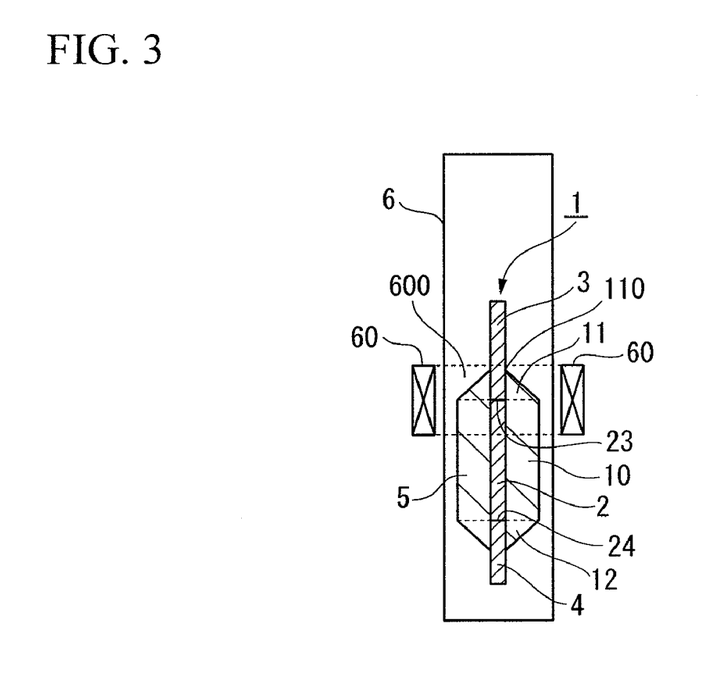
FIG. 3 is a vertical cross section schematically exemplifying the glass preform in the zone heating furnace at a state at which a relative movement of the glass preform is stopped in the second step.

FIG. 3 is a vertical cross section exemplifying the glass preform in the zone heating furnace when the relative movement of glass preform and the heater is stopped. The figure shows a state at which the end portion 110 of the first invalid portion 11 is disposed in the main heating region 600. In the present invention, the relative movement may be stopped at the time when the first invalid portion 11 reaches the vicinity of the heater 60. It is preferable that the relative movement is stopped at a state in which at least a portion of the first invalid portion exists in the main heating region 600. More preferably, the relative movement is stopped at a state in which a whole of the first invalid portion 11 exists in the main heating region 600. By thus stopping the relative movement or decreasing the moving velocity of the relative movement at a state at which the invalid portion is positioned in the vicinity of the heater 60 or overlapped with the position of the heater 60, it is possible to perform the heat treatment of the invalid portion more effectively in the third step. The overlapping of the invalid portion and the heater 60 denotes a state at which an upper end of the invalid portion is positioned not higher than the upper end of the heater 60 and the lower end of the invalid portion is positioned not lower than the lower end of the heater 60.

When the moving velocity of the relative movement is decreased, the relative moving velocity may be decreased at the time at which the first invalid portion 11 reaches the vicinity of the heater 60. In this case, it is preferable to decrease the relative moving velocity at the time when the boundary between the first invalid portion 11 and the valid portion 10 reaches the main heating region 600.

The decreased moving velocity is not limited provided that the first dummy rod 3 can be sufficiently heated by the heater 60. It is preferable to control the moving velocity such that the temperature difference between the center portion and peripheral portion of the first dummy rod 3 is decreased. The temperature difference depends on the diameter of the first dummy rod 3. Therefore, the decreased moving velocity is preferably controlled in accordance with the diameter of the first dummy rod 3. It is preferable to decrease the moving velocity to as low as possible irrespective of the diameter of the dummy rod. In general, it is preferable to decrease the moving velocity to be 10 mm/hour or less.

After that, the relative movement may be stopped at any time after a sufficient vitrification of the silica glass porous body 5.

In the above-description, an embodiment of lifting down the glass preform 1 relative to the fixed heater 60 along the axial direction of the glass rod 2 was explained with reference to FIG. 2. Alternatively, it is possible to fix the glass preform 1 and lift up the heater 60 along the axial direction of the glass rod 2. In this case, it is possible to control the relative position of the glass preform 1 and the heater in a similar manner as in the above-described embodiment by stopping the heater 60 or decreasing the relative moving velocity of the heater 60.

In the present invention, it is possible to move both of the heater 60 and the glass preform 1 such that a relative position between the heater 60 and the glass preform 1 is changed. At this time, the heater 60 and the glass preform 1 may be moved in the same direction (C-1) or in the opposite direction (C-2). For example, when the heater 60 and the glass preform 1 is moved in the same direction (C-1), it is possible for the moving velocity of the glass preform 1 to be greater than that of the heater 60 while lowering the heater 60 and the glass preform 1. When the heater 60 and the glass preform 1 are moved in the opposite direction (C-2), it is possible to lift up the heater and lower the glass preform 1. In this case, it is possible to set the moving velocities of the heater 60 and the glass preform 1 in arbitrary velocities. In this case, it is possible to stop the relative movement or decrease the velocity of the relative movement in the second step such that the relative position of the heater 60 and the glass preform 1 is controlled in the similar manner as in the above-described relative position.

Third Step

In the third step subsequent to the second step, heating of the invalid portion is continued for a predetermined time while maintaining the heating temperature at a temperature at which the silica glass porous body can be vitrified.

As a result, it is possible to obtain a preform in which the silica glass porous body has been vitrified to a transparent glass. Since the glass rod in the invalid portion (in FIG. 3, the first dummy rod 3 in the first invalid portion 11) is sufficiently heated from its periphery to the central portion, the temperature difference along its radial direction is decreased sufficiently. In addition, tensile force due to a mass of the preform is applied relatively homogeneously at any position along the radial direction of the glass rod. Here the homogeneity of the tensile force shows that a difference in the tensile force in a different radial position is reduced to a level such that the impact resistance and heat shock resistance are acceptable in a practical operation of drawing an optical fiber. As a result, a difference in residual stress along the radial direction of the glass rod of the invalid portion is decreased and strain of the glass rod of invalid portion along the radial direction is decreased. Therefore, impact resistance and heat shock resistance of the glass rod of the invalid portion is improved. In FIG. 3, for example, such an effect can be exerted not only in the first dummy rod 3 in the first invalid portion 11 but also in the glass rod 2 sufficiently heated in the main heating region 600. Specifically, the exposed portion of the first dummy rod 3 which is not deposited with the silica glass porous body 5 and a portion of the glass rod 2 of the valid portion 10 in the vicinity of the first invalid portion exert a similar effect.

The heating temperature maintained in the third step is not limited provided that the silica glass porous body can be vitrified. For example, the heating temperature may be the same as the vitirification temperature used in the second step. Alternatively, the heating temperature may be increased or decreased from the vitrification temperature in the second step. In order to further decrease the temperature difference in the radial direction of the glass rod, it is preferable to use the same temperature or a higher temperature compared to the heating temperature used in the second step. On the other hand, in order to simplify the operation, it is preferable to use the same temperature or a lower temperature compared to the heating temperature used in the second step. Therefore, it is preferable to maintain the same heating temperature in the third step as the heating temperature in the second step in order to exert the effect of the present invention while simplifying the operation.

Where the heating temperature is too high, viscosity of the glass rod in the invalid portion is decreased, causing a possibility of drawing the glass rod by its own mass or by the mass of the valid portion supported by the glass rod. As a result, there is a possibility that the vitrified glass preform drops from the invalid portion or the lower portion of the preform is in contact with the furnace pipe, thereby deforming the furnace pipe. On the other hand, when the heating temperature is too low, it is impossible to obtain the effects of the present invention. Based on the above-described view point, the heating temperature maintained in the third step is preferably not lower than 1400° C. and not higher than 1600° C., more preferably, not lower than 1450° C. and not higher than 1550° C.

It is preferable to control the retention time of maintaining the heating temperature in accordance with the heating temperature and a diameter if the glass rod. Where the retention time is too long, there occurs a similar problem as in the case of using an excessive heating temperature. Where the retention time is too short, there occurs a problem of using an insufficient heating temperature.

The preferable retention time may be expressed as a function of the diameter of the glass rod in the invalid portion. For example, in the case of the glass preform 1 shown in FIG. 1, the retention time is preferably within a range shown by the formula (1) below.

$$0.020D_3^2 - 0.597D3 + 3.588 \leq Y \leq 0.022D_3^2 + 0.280D_3 - 13.104 \quad (1)$$

whereas Y=0 where the formula (1) satisfies Y<0.

In the following, the above-described formula is explained more in detail.

In general, a heat conduction equation is expressed by the below-described formula (2).

$$\frac{\partial \theta}{\partial t} = a \frac{\partial^2 \theta}{\partial x^2} + q(x) \quad (2)$$

where $\theta$ denotes a temperature, $\alpha$ denotes a heat diffusion coefficient, and $q(x)$ denotes a change of temperature due to a heat source.

Further, the $\alpha$ is expressed by the below-described formula (3).

$$a = \frac{K}{c\rho} \quad (3)$$

where K denotes heat conduction coefficient, c denotes a specific heat, and $\rho$ denotes a density.

FIGS. 4A, 4B, 5A, 5B, 6A, and 6B show a relation between the temperature inside the glass rod and the retention time obtained using the above described formulae 2, 3 and the below described conditions. A shape of the glass rod in the invalid portion of the glass preform was approximated to a circular column. A temperature of the glass rod on its periphery was set to be a vitrification temperature of the silica glass preform. It was assumed that the heat source did not exist inside the glass rod such that q(x)=0 was satisfied. Under the above-described assumption, heat conduction speed into the glass rod in the invalid portion was calculated using a finite element method, a finite difference method, a finite volume method or the like, and the relationship between the temperature inside the glass rod and the retention time was calculated.

Figure 4A:
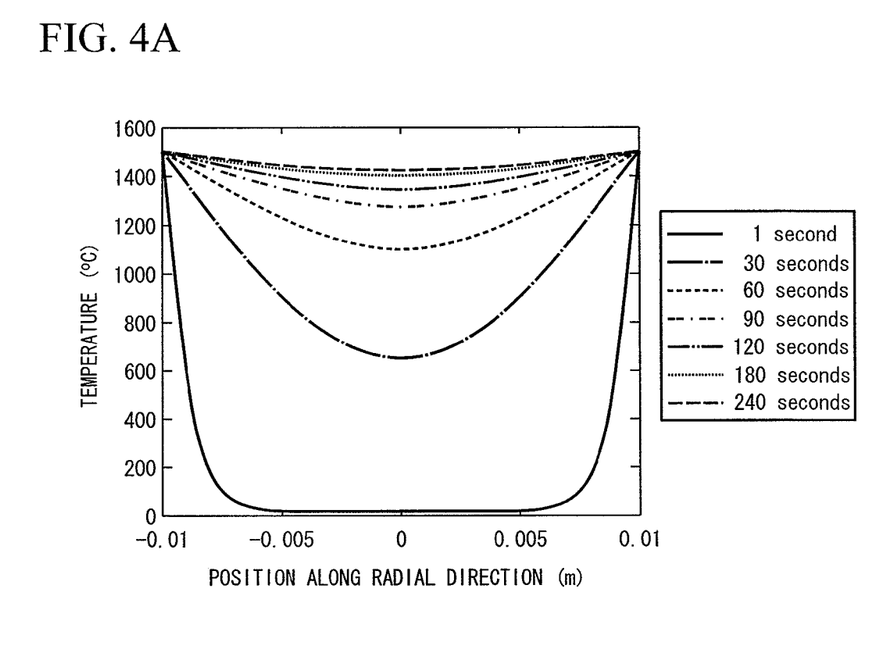
FIG. 4A shows a thermal distribution along the radial direction per retention time.
Figure 4B:
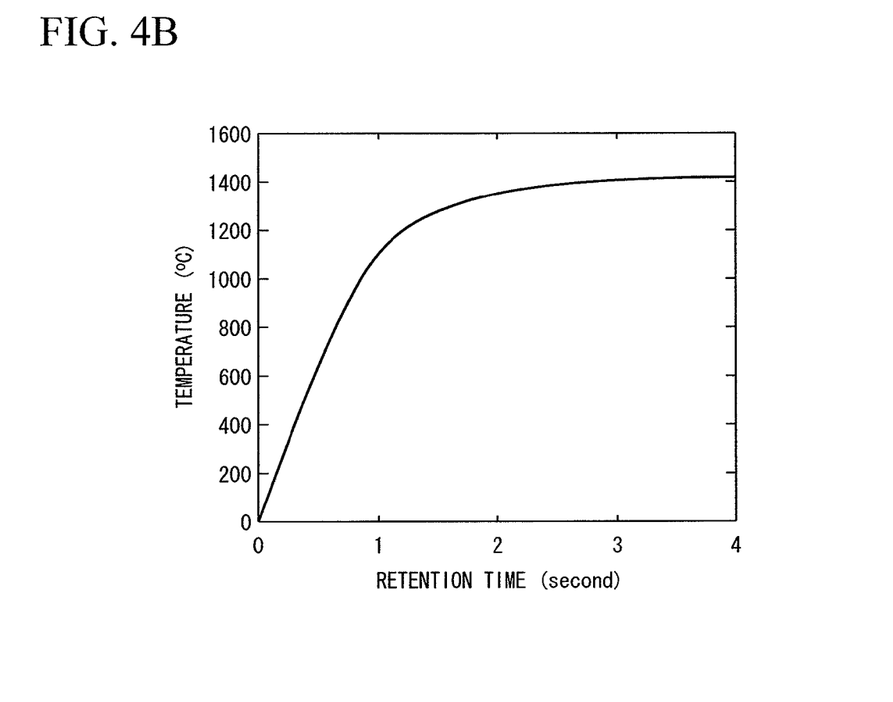
FIG. 4B shows relationship between the retention time and a temperature in the central portion of the glass rod.
Figure 5A:
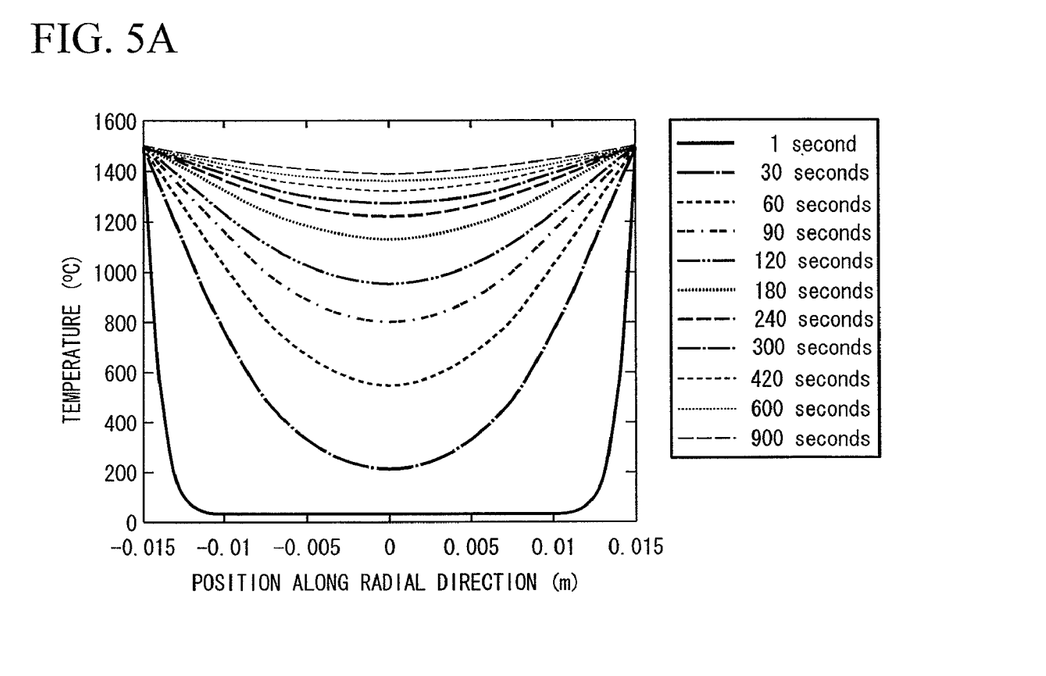
FIG. 5A shows a thermal distribution along the radial direction per retention time.
Figure 5B:
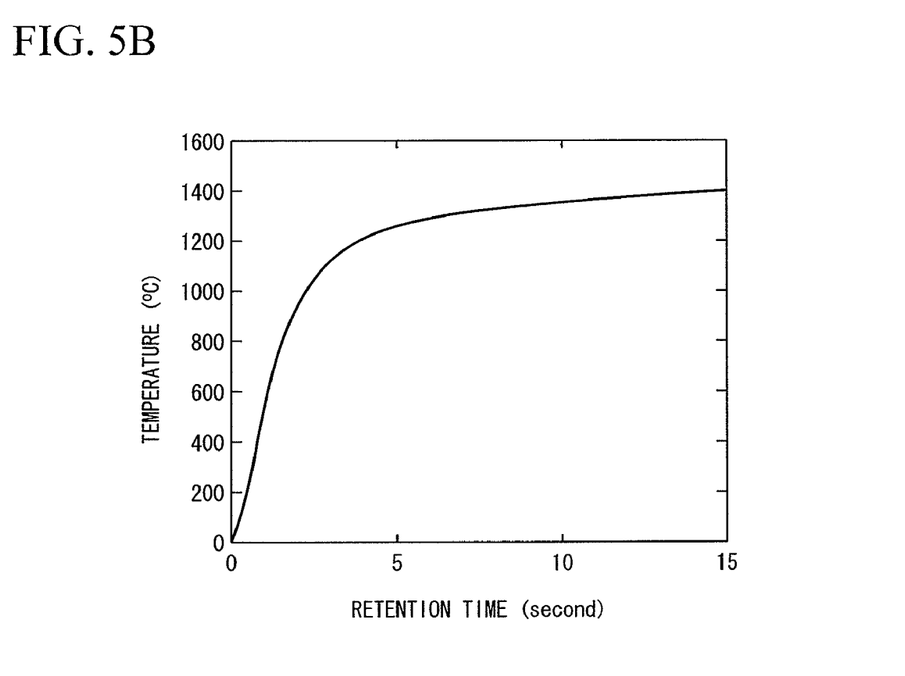
FIG. 5B shows relationship between the retention time and a temperature in the central portion of the glass rod.
Figure 6A:
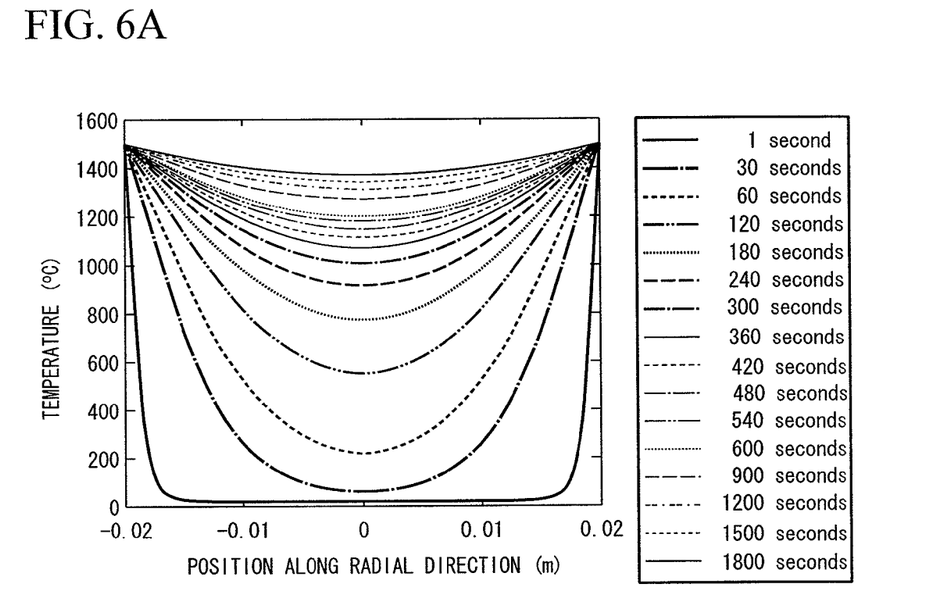
FIG. 6A shows a thermal distribution along the radial direction per retention time.
Figure 6B:
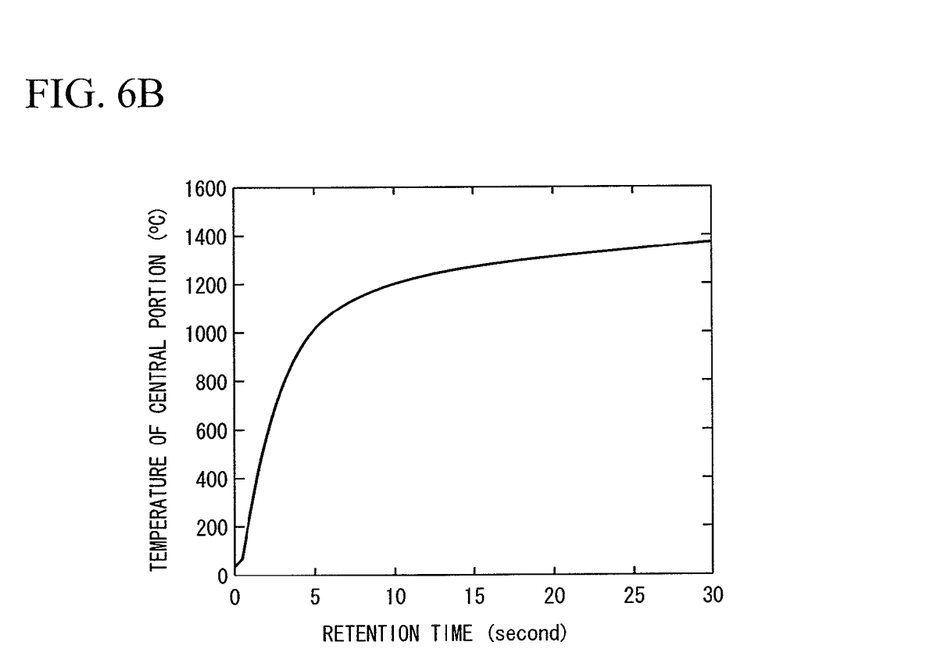
FIG. 6B shows relationship between the retention time and a temperature in the central portion of the glass rod.

FIGS. 4A, 5A, and 6A show radial thermal distribution depending on the retention time. FIGS. 4B, 5B, and 6B are the graphs showing relationships between the retention time and the temperature in the central portion of the glass rod. For example, the radial position of 0 m in the horizontal axis denotes a center position in each of FIGS. 4A, 5A, and 6A.

Each of FIGS. 4A to 6B is obtained by representative results of calculation. In the calculation, the diameter of the glass rod in the invalid portion (hereafter referred to as dummy diameter) was set to be 20 mm for FIGS. 4A and 4B, 30 mm for FIGS. 5A and 5B, and 40 mm for FIGS. 6A and 6B.

From these results, it is understood that a relatively long time is required for elevating the temperature to the central portion of the glass rod of a large dummy diameter. For example, when the dummy diameter is 20 mm, the retention time of about 90 seconds is requited for suppressing the temperature difference between the central portion and peripheral portion of the glass rod to be no higher than 250° C. On the other hand, to obtain a temperature difference of similar level, retention time of about 5 minutes is required in the case of dummy diameter of 30 mm, and retention time of about 15 minutes is required in the case of dummy diameter of about 40 mm.

Figure 7:
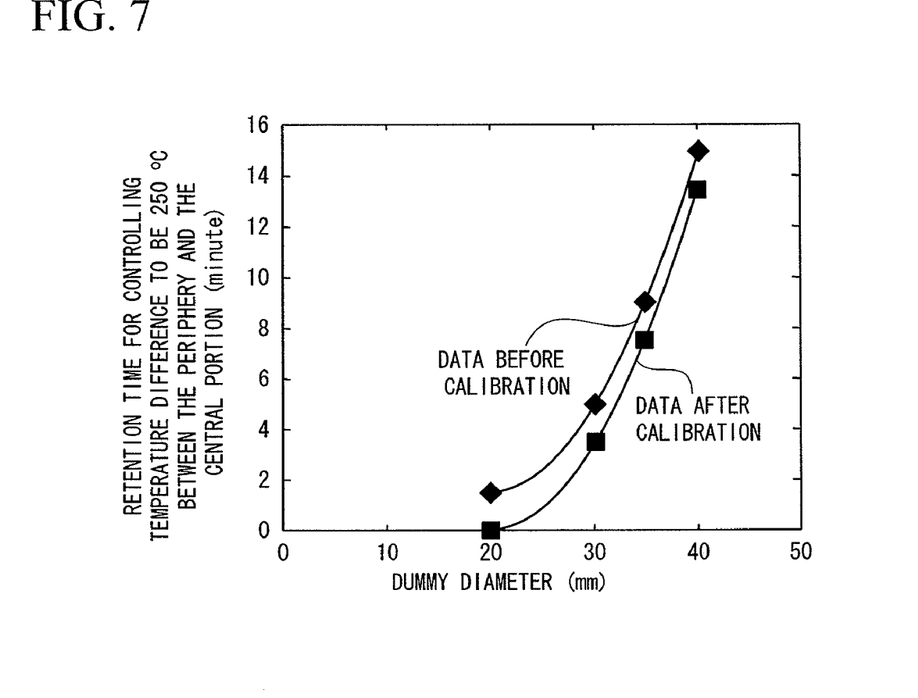
FIG. 7 is a graph showing a relationship before calibration and a relationship after the calibration between the retention time and a diameter of a glass rod required for controlling the temperature difference to be 250° C. between the periphery and the central portion of the invalid portion.

The results shown in FIGS. 4A, 4B, 5A, 5B, 6A, and 6B were calculated only taking the heat conduction into consideration. Therefore, the results are not perfectly coincident with the case in the practical heating furnace where the glass preform in the vitrification process moves relative to the heater, and heat radiation, and heat convection occur. However, since the silica glass porous body is vitrified at a relatively low temperature of about 1500° C., it is considered that heat radiation has a small influence. In addition, it is considered that the temperature inside the glass rod is mainly governed by the heat conduction from its surface to its inside, and the heat convection has only a small influence. Therefore, the above-described results are regarded to show substantially practical relationships between the temperature inside the glass rod and the retention time, and are calibrated so as to be consistent with the experimental results. FIG. 7 shows a relationship between the retention time and dummy diameter required to suppress the temperature difference between the central portion of the glass rod and the periphery of the glass rod to be no higher than 250° C. As shown in FIG. 7, the graph before the calibration can be approximated as a quadratic curve. On the other hand, in the practical case, it is known that a glass rod having a dummy diameter of 20 mm has small residual strain and satisfactory impact resistance and heat shock resistance even when the retention time of heating is 0. It is considered that a primary value in the practical case is different from the above-described calculated value since the heat from the heater diffuses not only in the radial direction of the glass rod but also in the axial direction (moving direction) because of the relative movement of the glass preform and the heater in the vitrification process. Therefore, the calculated value is correlated to the practical value by shortening the retention time such that the retention time of 90 seconds in the case of a dummy diameter of 20 mm is offset to 0 seconds.

Figure 8:
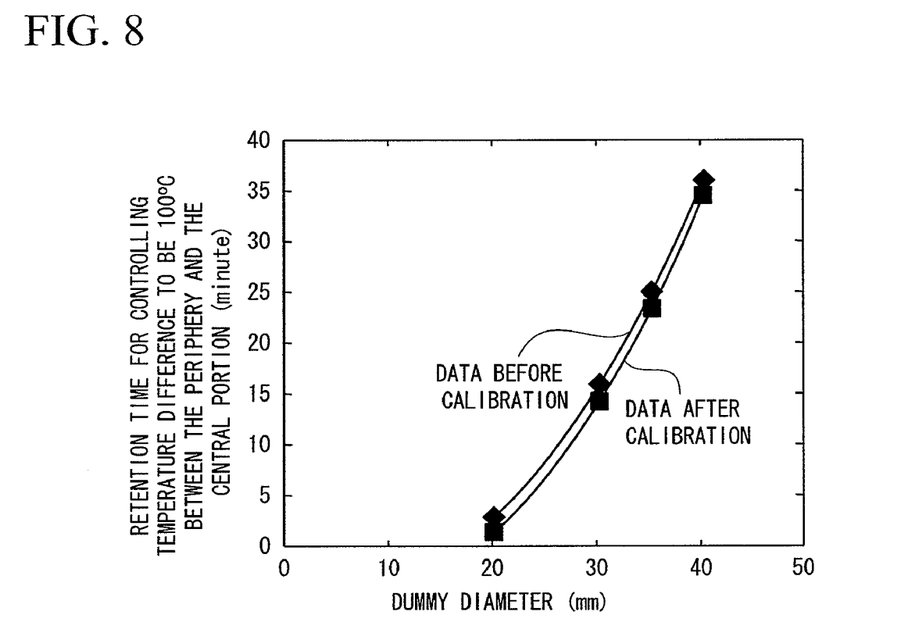
FIG. 8 is a graph showing a relationship before calibration and a relationship after the calibration between the retention time and a diameter of a glass rod required for controlling the temperature difference to be 100° C. between the periphery and the central portion of the invalid portion.

In a similar manner, a relationship between the retention time and the dummy diameter required for suppressing the temperature difference between the core and the periphery of the glass rod to 100° C. is shown in FIG. 8. FIG. 8 shows both of the calculated results before the calibration and calibrated result.

Figure 9:
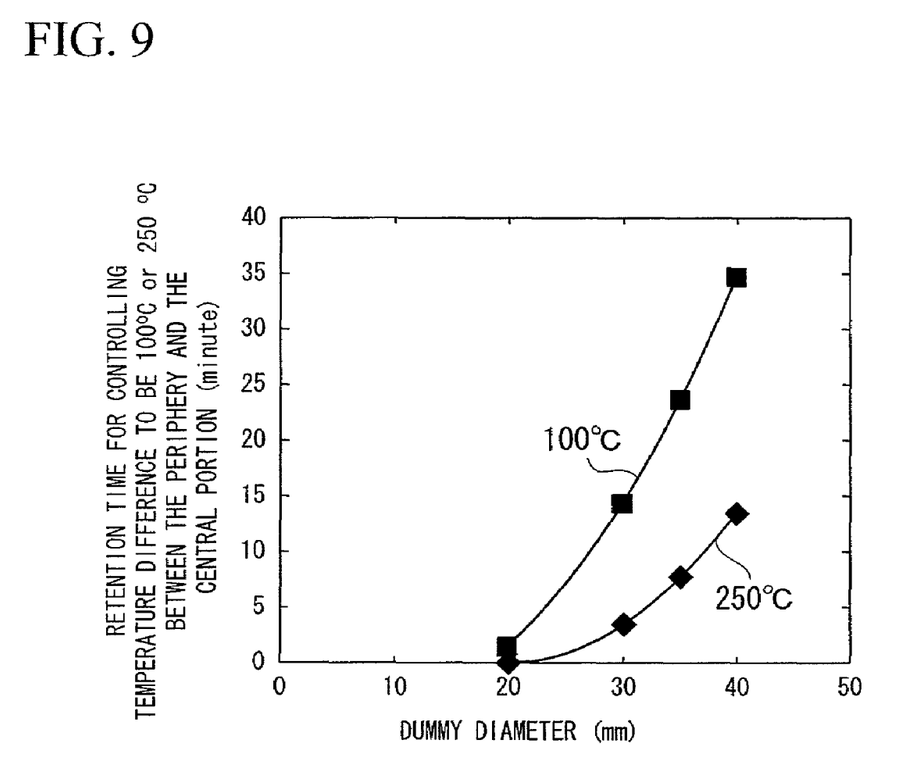
FIG. 9 is a graph showing data after a calibration of FIGS. 7 and 8.

The data after the calibration in FIG. 7 and FIG. 8 are shown in FIG. 9.

From FIG. 9 it is understood that, by approximating each curve by a quadratic curve, a dummy diameter X (mm) in the horizontal axis and retention time Y (minute) in the vertical axis preferably satisfies the below described formula (1).

$$0.020X^2 - 0.597X + 3.588 \leq Y \leq 0.022X^2 + 0.280X - 13.104 \quad (1)$$

That is, by controlling the retention time to be in such a preferable range, the heat is sufficiently conducted from the periphery to the central portion of the glass rod in the invalid portion, thereby decreasing temperature difference along the radial direction. Since the temperature shows small difference along the radial direction, the difference in viscosity is also decreased. As a result, residual strain is decreased and the difference in the residual strain along the radial direction is decreased. Therefore, impact resistance and heat shock resistance in the glass rod of the invalid portion is improved.

In the present invention, from the end of the third step to the beginning of the fourth step, temperature difference along the radial direction of the glass rod in the invalid portion is preferably in the range of 100 to 250° C.

In the above described preferable range, since the temperature difference along the radial direction of the glass rod is small but is not zero, drawing (stretching) of the glass rod by the heating is suppressed, the difference in residual strain along the radial direction of the glass rod caused by supporting the preform is sufficiently reduced, and impact resistance and heat shock resistance of the glass rod is remarkably improved.

Fourth Step

In the fourth step subsequent to the third step, heating temperature in the heating furnace is decreased to be not higher than a temperature determined by adding 200° C. to an annealing point of a silica glass. Here, the heating temperature denotes a temperature for heating the preform.

If the vitrified preform is quenched, for example by removing it from the heating furnace directly after the third step, residual strain is additionally generated along the radial direction of the glass rod in the invalid portion depending on the ambient temperature at the time of starting the quenching. As a result, radial distribution of the residual strain is largely changed when the preform is worked to an optical fiber preform. However, by gradually cooling the preform to a predetermined temperature without quenching the preform after the third step, it is possible to inhibit abrupt change of radial thermal distribution of the preform. As a result, the radial distribution of the residual strain scarcely changes after the end of the third step. In the present invention, change of the radial distribution of residual strain in the glass rod is suppressed by reducing the heating temperature to be no higher than a temperature determined by adding 200° C. to an annealing point of a silica glass after the third step. In that time, the heating temperature is decreased in the heating furnace covered by insulating member or the like and having a heat insulating effect. Therefore, quenching of the preform can be avoided.

In general, after the vitrification of the porous silica glass body, it is preferable to decrease the heating temperature in the heating furnace to a temperature not higher than the annealing point of a silica glass and subsequently removing the obtained preform from the heating furnace to the outside. In the present invention, different from the conventional method, it is possible to suppress the difference in residual strain along the radial direction of the glass rod of the invalid portion to a small value by performing the above-described third step. Therefore, even when the preform is removed from the heating furnace in a state in which the heating temperature in the furnace is not lower than the annealing temperature of the silica glass, change of radial distribution is suppressed.

Based on extensive research, the inventors found that the upper limit of the heating temperature for removing the silica glass preform from the heating furnace to the outside could be set a temperature of 200° C. higher than the annealing point of the silica glass. This upper limit is lower than the temperature at which the silica glass porous body is vitrified.

By thus controlling the upper limit of the heating temperature in the heating furnace, it is possible to shorten the cooling time in the heating furnace and to obtain an optical fiber preform of a satisfactory quality without deteriorating the production efficiency.

In the fourth step, the decreased temperature may be higher than the annealing temperature of a silica glass.

In the fourth step, it is preferable to decrease the heating temperature in the heating furnace to 1000 to 1350° C., more preferably to 1200 to 1350° C.

In the fourth step, it is preferable to control a decreasing rate of the heating temperature to be 1° C./minute to 20° C./minute.

Fifth Step

In the fifth step subsequent to the fourth step, the obtained silica glass preform is removed from the heating furnace to the outside without increasing the heating temperature to the temperature at which the silica glass porous body is vitrified.

In this step, it is preferable to remove the silica glass preform from the heating furnace after the fourth step without increasing the heating temperature in the heating furnace. Where necessary, it is acceptable to increase the heating temperature in the heating furnace to a temperature lower than the vitrification temperature of the silica glass porous body, and subsequently remove the silica glass preform. However, a complex process is required.

Optical Fiber Preform and Glass Rod for Producing an Optical Fiber Preform

An optical fiber preform of the present invention is a preform which has been produced by the above-described method.

A glass rod for producing an optical fiber preform according to the present invention is a glass rod which has been removed from the invalid portion after performing the heat treatment of the invalid portion for a predetermined time in the above-described third step. That is, the above-described glass rod is an exposed end portion of a predetermined length projected from the invalid portion deposited with the silica glass porous body. By removing the exposed glass rod (end portion of the glass rod) after performing heating of the invalid portion for a predetermined time in the third step, the obtained glass rod has a small difference in residual strain along the radial direction. Such a glass rod may be reused, for example as a dummy rod, in a production of an optical fiber preform without performing retreatment such as annealing.

According to the production method of the present invention, it is possible to decrease the difference in residual strain along the radial direction of the glass rod in the invalid portion after performing the heat treatment of the invalid portion for a predetermined time in the above-described third step, thereby enhancing the impact resistance and heat shock resistance of the glass rod. Such an optical fiber preform is easily treated when the preform is removed from the heating furnace, carried, and drawn to an optical fiber, and there is a little possibility of deformation. Such a production method of an optical fiber preform having a support portion of excellent impact resistance and heat shock resistance can be appropriately applied for a production of a large-sized optical fiber preform. Further, the glass rod removed from the invalid portion has a small difference in residual strain along the radial direction, it is possible to reuse the glass rod as a support member (dummy rod) in the production of an optical fiber preform without performing annealing treatment or the like. Therefore, it is possible to produce optical fiber preforms of high quality at low cost.

EXAMPLES

In the following, the present invention is explained in more detail with reference to Examples. It should be noted that the present invention is not limited to the below described examples.

In general strain viewer method or the like are used as a method of evaluating a residual strain. However, evaluation of strain on the periphery or the like of the glass rod is very difficult in such a method. Therefore, in the present Examples, residual strain of the grass rod along its radial direction was evaluated in accordance with the following method.

Evaluation Method.

After cooling the vitrified preform in the heating furnace (after the fourth step in the present invention), a groove (scratch) of 1 mm in width and 0.5 mm in depth and of semiperimeter length was formed in the circular direction on the periphery of the glass rod in the invalid portion of the each sample using a file. Within 24 hours after forming the groove, absence or presence of cracking caused by the development of the groove was examined.

Example 1

Using a glass rod having an invalid portion with a diameter (dummy diameter) of 35 mm, a glass preform (porous glass preform) of about 20 kg was formed by outside deposition of porous silica glass body on a glass rod. Next, the glass preform was subjected to vitrification of the porous silica glass body at 1480° C. by using a zone heating furnace as shown in FIG. 2 and lowering the glass preform relative to the heater fixed in the heating furnace with a moving velocity of 100 mm/hour. The movement of the glass preform was stopped in a state in which a portion of the first invalid portion on the upper side of the glass preform was arranged in the main heating furnace, and this state was maintained for 10 minutes. In accordance with the above-described method, the temperature difference between the central portion and the periphery of the glass rod and a preferable retention time of the heating were 206° C. and 7.2 to 23.6 minutes. Next, after cooling the temperature to 1350° C., the optical fiber preform was removed to the outside. In accordance with this method, 10 optical fiber preforms were produced. As a result of evaluation of the residual strain in the glass rods of invalid portions, cracking was not detected in any of the samples.

Example 2

Using a glass rod Using a glass rod having an invalid portion with a diameter (dummy diameter) of 40 mm, a glass preform (porous glass preform) of about 50 kg was formed by outside deposition of porous silica glass body on the glass rod. Next, the glass preform was subjected to vitrification of the porous silica glass body at 1490° C. by using a zone heating furnace in a similar manner as in Example 1 and lifting down the glass preform relative to the heater fixed in the heating furnace with a moving velocity of 100 mm/hour. The movement of the glass preform was stopped in a state in which a portion of the first invalid portion on the upper side of the glass preform was arranged in the main heating furnace, and this state was maintained for 15 minutes. In accordance with the above-described method, the temperature difference between the central portion and the periphery of the glass rod and a preferable retention time of the heating were 220° C. and 11.7 to 33.3 minutes. Next, after cooling the temperature to 1300° C., the optical fiber preform was removed to the outside. In accordance with this method, 10 optical fiber preforms were produced. As a result of the evaluation of the residual strain in the glass rods of invalid portions, cracking was not detected in any of the samples.

Example 3

Using a glass rod having an invalid portion with a diameter (dummy diameter) of 45 mm, a glass preform (porous glass preform) of about 80 kg was formed by outside deposition of porous silica glass body on the glass rod. Next, the glass preform was subjected to vitrification of the porous silica glass body at 1500° C. by using a zone heating furnace in a similar manner as in Example 1 and lowering the glass preform relative to the heater fixed in the heating furnace with a moving velocity of 100 mm/hour. The movement of the glass preform was stopped in a state in which a portion of the first invalid portion on the upper side of the glass preform was arranged in the main heating furnace, and this state was maintained for 15 minutes. In accordance with the above-described method, the temperature difference between the central portion and the periphery of the glass rod and a preferable retention time of the heating were 159° C. and 17.2 to 44.0 minutes. Next, after cooling the temperature to 1250° C., the optical fiber preform was removed to the outside. In accordance with this method, 10 optical fiber preforms were produced. As a result of the evaluation of the residual strain in the glass rods of invalid portions, cracking was not detected in any of the samples.

Example 4

Using a glass rod having an invalid portion with a diameter (dummy diameter) of 35 mm, a glass preform (porous glass preform) of about 20 kg was formed by outside deposition of porous silica glass body on the glass rod. Next, the glass preform was subjected to vitrification of the porous silica glass body at 1480° C. by using a zone heating furnace in a similar manner as in Example 1 and lowering the glass preform relative to the heater fixed in the heating furnace with a moving velocity of 100 mm/hour. The movement of the glass preform was stopped in a state in which a portion of the first invalid portion on the upper side of the glass preform was arranged in the main heating furnace, and this state was maintained for 20 minutes. In accordance with the above-described method, the temperature difference between the central portion and the periphery of the glass rod and a preferable retention time of the heating were 126° C. and 7.2 to 23.6 minutes. Next, after cooling the temperature to 1350° C., the optical fiber preform was removed to the outside. In accordance with this method, 10 optical fiber preforms were produced. As a result of evaluation of the residual strain in the glass rods of invalid portions, cracking was not detected in any of the samples.

Example 5

Using a glass rod having an invalid portion with a diameter (dummy diameter) of 40 mm, a glass preform (porous glass preform) of about 50 kg was formed by outside deposition of porous silica glass body on the glass rod. Next, the glass preform was subjected to vitirification of the porous silica glass body at 1490° C. by using a zone heating furnace in a similar manner as in Example 1 and lowering the glass preform relative to the heater fixed in the heating furnace with a moving velocity of 100 mm/hour. The movement of the glass preform was stopped in a state in which a portion of the first invalid portion on the upper side of the glass preform was arranged in the main heating furnace, and this state was maintained for 20 minutes. In accordance with the above-described method, the temperature difference between the central portion and the periphery of the glass rod and a preferable retention time of the heating were 121° C. and 11.7 to 33.3 minutes. Next, after cooling the temperature to 1300° C., the optical fiber preform was removed to the outside. In accordance with this method, 10 optical fiber preforms were produced. As a result of evaluation of the residual strain in the glass rods of invalid portions, cracking was not detected in any of the samples.

Example 6

Using a glass rod having an invalid portion with a diameter (dummy diameter) of 45 mm, a glass preform (porous glass preform) of about 80 kg was formed by outside deposition of porous silica glass body on the glass rod. Next, the glass preform was subjected to vitirification of the porous silica glass body at 1500° C. by using a zone heating furnace in a similar manner as in Example 1 and lowering the glass preform relative to the heater fixed in the heating furnace with a moving velocity of 100 mm/hour. The movement of the glass preform was stopped in a state in which a portion of the first invalid portion on the upper side of the glass preform was arranged in the main heating furnace, and this state was maintained for 40 minutes. In accordance with the above-described method, the temperature difference between the central portion and the periphery of the glass rod and a preferable retention time of the heating were 110° C. and 17.2 to 44.0 minutes. Next, after cooling the temperature to 1250° C., the optical fiber preform was removed to the outside. In accordance with this method, 10 optical fiber preforms were produced. As a result of evaluation of the residual strain in the glass rods of invalid portions, cracking was not detected in any of the samples.

Comparative Example 1

Using a glass rod having an invalid portion with a diameter (dummy diameter) of 35 mm, a glass preform (porous glass preform) of about 20 kg was formed by outside deposition of porous silica glass body on the glass rod. Next, the glass preform was subjected to vitirification of the porous silica glass body at 1480° C. by using a zone heating furnace in a similar manner as in Example 1 and lowering the glass preform relative to the heater fixed in the heating furnace with a moving velocity of 100 mm/hour. The movement of the glass preform was stopped in a state in which a portion of the first invalid portion on the upper side of the glass preform was arranged in the main heating furnace, and this state was maintained for 5 minutes. In accordance with the above-described method, the temperature difference between the central portion and the periphery of the glass rod and a preferable retention time of the heating were 344° C. and 7.2 to 23.6 minutes. Next, after cooling the temperature to 1450° C., the optical fiber preform was removed to the outside. In accordance with this method, 10 optical fiber preforms were produced. As a result of evaluation of the residual strain in the glass rods of invalid portions, 4 of the ten glass rod showed cracking.

Comparative Example 2

Using a glass rod having an invalid portion with a diameter (dummy diameter) of 40 mm, a glass preform (porous glass preform) of about 50 kg was formed by outside deposition of porous silica glass body on the glass rod. Next, the glass preform was subjected to vitirification of the porous silica glass body at 1490° C. by using a zone heating furnace in a similar manner as in Example 1 and lifting down the glass preform relative to the heater fixed in the heating furnace with a moving velocity of 100 mm/hour. The movement of the glass preform was stopped in a state in which a portion of the first invalid portion on the upper side of the glass preform was arranged in the main heating furnace, and this state was maintained for 10 minutes. In accordance with the above-described method, the temperature difference between the central portion and the periphery of the glass rod and a preferable retention time of the heating were 290° C. and 11.7 to 33.3 minutes. Next, after cooling the temperature to 1400° C., the optical fiber preform was removed to the outside. In accordance with this method, 10 optical fiber preforms were produced. As a result of evaluation of the residual strain in the glass rods of invalid portions, 6 of the ten glass rods showed cracking.

Comparative Example 3

Using a glass rod having an invalid portion with a diameter (dummy diameter) of 45 mm, a glass preform (porous glass preform) of about 80 kg was formed by outside deposition of porous silica glass body on the glass rod. Next, the glass preform was subjected to vitirification of the porous silica glass body at 1500° C. by using a zone heating furnace in a similar manner as in Example 1 and lowering the glass preform relative to the heater fixed in the heating furnace with a moving velocity of 100 mm/hour. The movement of the glass preform was stopped in a state in which a portion of the first invalid portion on the upper side of the glass preform was arranged in the main heating furnace, and this state was maintained for 15 minutes. In accordance with the above-described method, the temperature difference between the central portion and the periphery of the glass rod and a preferable retention time of the heating were 270° C. and 17.2 to 44.0 minutes. Next, after cooling the temperature to 1250° C., the optical fiber preform was removed to the outside. In accordance with this method, 10 optical fiber preforms were produced. As a result of evaluation of the residual strain in the glass rods of invalid portions, 3 of ten glass rods showed cracking.

Comparative Example 4

Using a glass rod having an invalid portion with a diameter (dummy diameter) of 35 mm, a glass preform (porous glass preform) of about 20 kg was formed by outside deposition of porous silica glass body on the glass rod. Next, the glass preform was subjected to vitirification of the porous silica glass body at 1480° C. by using a zone heating furnace in a similar manner as in Example 1 and lowering the glass preform relative to the heater fixed in the heating furnace with a moving velocity of 100 mm/hour. The movement of the glass preform was stopped in a state in which a portion of the first invalid portion on the upper side of the glass preform was arranged in the main heating furnace, and this state was maintained for 30 minutes. As a result, the glass rod of the invalid portion was drawn (stretched) and the preform dropped from the invalid portion. In accordance with the above-described method, the temperature difference between the central portion and the periphery of the glass rod and a preferable retention time of the heating were 84° C. and 7.2 to 23.6 minutes.

Comparative Example 5

Using a glass rod having an invalid portion with a diameter (dummy diameter) of 40 mm, a glass preform (porous glass preform) of about 50 kg was formed by outside deposition of porous silica glass body on the glass rod. Next, the glass preform was subjected to vitirification of the porous silica glass body at 1490° C. by using a zone heating furnace in a similar manner as in Example 1 and lowering the glass preform relative to the heater fixed in the heating furnace with a moving velocity of 100 mm/hour. The movement of the glass preform was stopped in a state in which a portion of the first invalid portion on the upper side of the glass preform was arranged in the main heating furnace, and this state was maintained for 40 minutes. As a result, the glass rod of the invalid portion was drawn (stretched) and the preform dropped from the invalid portion.

In accordance with the above-described method, the temperature difference between the central portion and the periphery of the glass rod and a preferable retention time of the heating were 83° C. and 11.7 to 33.3 minutes.

Comparative Example 6

Using a glass rod having an invalid portion with a diameter (dummy diameter) of 45 mm, a glass preform (porous glass preform) of about 80 kg was formed by outside deposition of porous silica glass body on the glass rod. Next, the glass preform was subjected to vitirification of the porous silica glass body at 1500° C. by using a zone heating furnace in a similar manner as in Example 1 and lowering the glass preform relative to the heater fixed in the heating furnace with a moving velocity of 100 mm/hour. The movement of the glass preform was stopped in a state in which a portion of the first invalid portion on the upper side of the glass preform was arranged in the main heating furnace, and this state was maintained for 60 minutes. As a result, the glass rod of the invalid portion was drawn (stretched) and the preform dropped from the invalid portion. In accordance with the above-described method, the temperature difference between the central portion and the periphery of the glass rod and a preferable retention time of the heating were 56° C. and 17.2 to 44.0 minutes.

Comparative Example 7

Using a glass rod having an invalid portion with a diameter (dummy diameter) of 20 mm, a glass preform (porous glass preform) of about 15 kg was formed by outside deposition of porous silica glass body on the glass rod. Next, the glass preform was subjected to vitirification of the porous silica glass body at 1460° C. by using a zone heating furnace in a similar manner as in Example 1 and lowering the glass preform relative to the heater fixed in the heating furnace with a moving velocity of 100 mm/hour. The movement of the glass preform was stopped in a state in which a portion of the first invalid portion on the upper side of the glass preform was arranged in the main heating furnace, and this state was maintained for 5 minutes. As a result, the glass rod of the invalid portion was drawn (stretched) and the preform dropped from the invalid portion. In accordance with the above-described method, the temperature difference between the central portion and the periphery of the glass rod and a preferable retention time of the heating were 62° C. and 0 to 1.3 minutes.

As described above, in Examples 1 to 6 in which heat treatment of each glass preform was performed under conditions in accordance with the method of the present invention, the glass rod of the invalid portion did not crack. It is considered that the glass rod has small residual strain, and the residual strain is relatively homogenized along the radial direction of the glass rod. On the other hand, in Comparative Examples 1 to 3 in which the retention time of heating the invalid portion was shorter than that of the conditions in accordance with the present invention, the glass rod of the invalid portion cracked. It is considered that the cracking was caused by relatively large residual strain and inhomogeneous distribution of the residual strain along the radial direction of the glass rod. In Comparative Examples 4 to 6 in which the retention time of heating the invalid portion was longer than that of the conditions in accordance with the present invention, the glass preform dropped from the invalid portion during the production process and an optical fiber preform could not be produced.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:
1. A method of producing an optical fiber preform by subjecting a glass preform that has a glass rod and a silica glass porous body deposited on a periphery of the glass rod and includes a valid portion used in a production of an optical fiber, and invalid portions adjacent to the valid portion to perform a heat treatment using a heater in a heating furnace to vitrify the silica glass porous body, comprising:
  performing a first step of heating the glass preform while moving the glass preform along its axial direction relative to the heater, thereby creating a relative movement between the glass preform and the heater;
  subsequent to the first step, when an invalid portion positioned at a tail end opposite to the moving direction of the glass preform reaches a vicinity of the heater, performing a second step of stopping the relative movement between the glass preform and the heater or decreasing a speed of the relative movement between the glass preform and the heater;
  subsequent to the second step, performing a third step of heat treatment of the invalid portion for a retention time while retaining a heating temperature to be a temperature at which the silica glass porous body can be vitrified to a transparent glass;
  subsequent to the third step, performing a fourth step of decreasing the heating temperature at which the heat treatment is performed to a temperature, the temperature being 200° C. higher than an annealing point of a silica glass; and subsequent to the fourth step, performing a fifth step of removing the glass preform to the outside of the heating furnace without increasing the heating temperature at which the heat treatment is performed to a temperature at which the silica glass porous body can be vitrified.

2. The method of producing an optical fiber preform according to claim 1, wherein a diameter X (mm) of the glass rod in the invalid portion and the duration Y(minutes) of maintaining the heating temperature in the third step preferably satisfy a relation expressed by the following formula, $$0.020X^2-0.597X+3.588 \leq Y \leq 0.022X^2+0.280X-13.104 \quad (1)$$

where Y>0.

3. The method of producing an optical fiber perform according to claim 1 wherein a mass of the glass perform is not smaller than 20 kg.

4. The method of producing an optical fiber preform according to claim 1, wherein the relative movement of the glass preform is stopped or a speed of the relative movement is decreased in the second step in a state in which the heater along the axial direction of the glass preform overlaps with the invalid portion at the tail end.

5. The method of producing an optical fiber preform according to claim 1, wherein a temperature difference in the invalid portion along a radial direction of the glass rod is not lower than 100° C. and not higher than 250° C., the heat treatment of the invalid portion is continued for the retention time while retaining the heating temperature to be a temperature at which the silica glass porous body can be vitrified to a transparent glass, and before decreasing the heating temperature at which the heat treatment is performed to the temperature 200° C. higher than the annealing point of the silica glass.

6. The method of producing an optical fiber preform according to claim 1, wherein the heating temperature in the first step is not lower than 1400° C. and not higher than 1600° C.

7. The method of producing an optical fiber preform according to claim 1, wherein the heating temperature in the heating furnace is decreased to be within a range of 1000° C. to 1350° C. in the fourth step.

8. The method of producing an optical fiber preform according to claim 1 or claim 2, wherein the heating temperature at which the heat treatment is performed in the heating furnace is decreased to be within a range of 1200° C. to 1350° C. in the fourth step.

9. The method of producing an optical fiber preform according to claim 1, wherein the silica glass porous body comprises a tapered shape.

* * * * *